United States Patent [19]
Gauper, Jr.

[11] 4,041,364
[45] Aug. 9, 1977

[54] ELECTROMAGNETICALLY SHIELDED ELECTRICAL CONVERTER AND AN IMPROVED ELECTROMAGNETIC SHIELD THEREFOR

[75] Inventor: Harold A. Gauper, Jr., Scotia, N.Y.

[73] Assignee: General Electric Company, Schenectady, N.Y.

[21] Appl. No.: 654,740

[22] Filed: Feb. 3, 1977

Related U.S. Application Data

[63] Continuation of Ser. No. 555,425, March 5, 1975, abandoned.

[51] Int. Cl.² .................................... H02M 3/22
[52] U.S. Cl. ............................. 363/15; 307/91; 307/150; 336/84
[58] Field of Search ............ 174/35 CE, 35 MS; 307/91, 150; 321/2, 8 R; 336/84 R, 84 C, 69, 196

[56] References Cited

U.S. PATENT DOCUMENTS

| | | | |
|---|---|---|---|
| 792,248 | 6/1905 | Campbell | 336/84 C X |
| 2,364,260 | 12/1944 | Winkler | 336/84 C X |
| 2,896,096 | 7/1959 | Schwarzer | 321/10 X |
| 2,914,719 | 11/1959 | Walton et al. | 336/84 C X |
| 3,244,960 | 4/1966 | Stevens et al. | 321/8 |
| 3,517,361 | 6/1970 | Reifel et al. | 336/84 C |
| 3,522,509 | 8/1970 | Hasenbalg | 321/2 |
| 3,582,754 | 6/1971 | Hoffmann | 321/2 |

Primary Examiner—William M. Shoop
Attorney, Agent, or Firm—Jerome C. Squillaro; Joseph T. Cohen

[57] ABSTRACT

Electromagnetic interference shields are connected to electrical reference points from specially selected null or "center tap" connection points where noise voltages induced in the surface of the electromagnetic shield are substantially balanced out such that injection of such induced interference noise voltages to the connected reference points are substantially reduced. Special selection of isolated reference points for the input and output circuits as well as a special combination of electromagnetic interference shields substantially reduces the electromagnetic interference emanations from an electrical power supply circuit incorporating an inverter and transformer windings therewithin which normally constitute sources of unwanted electromagnetic interference signals unless suppressed.

49 Claims, 5 Drawing Figures

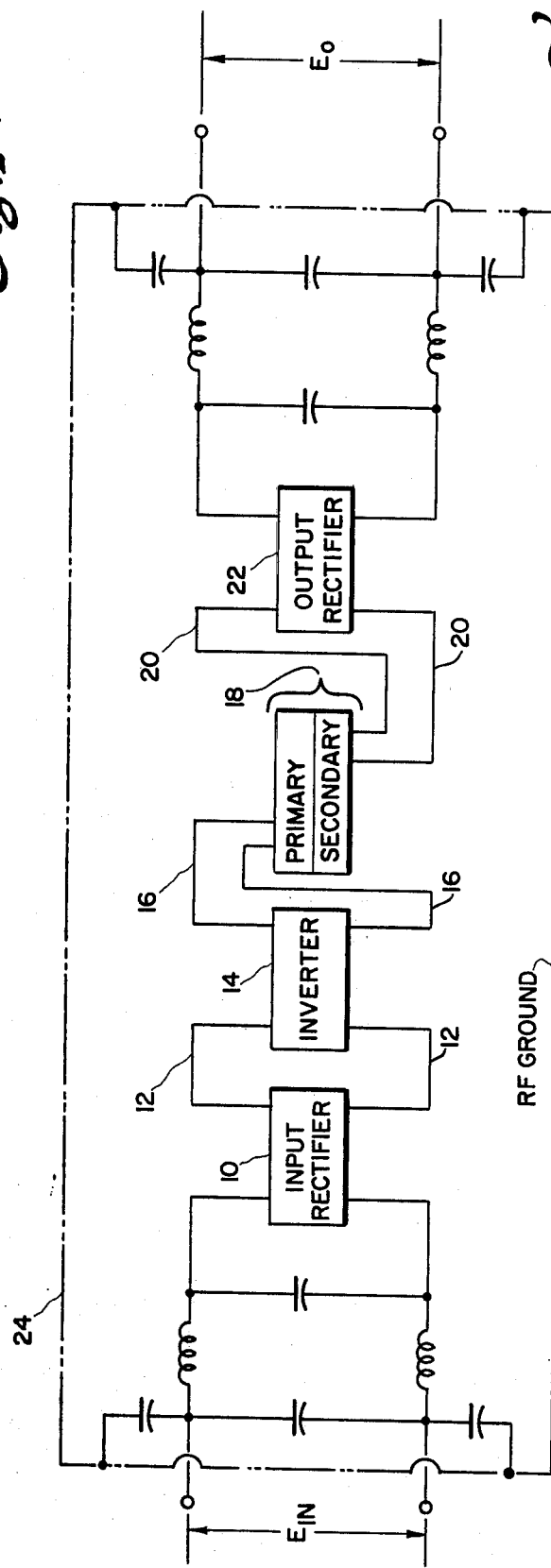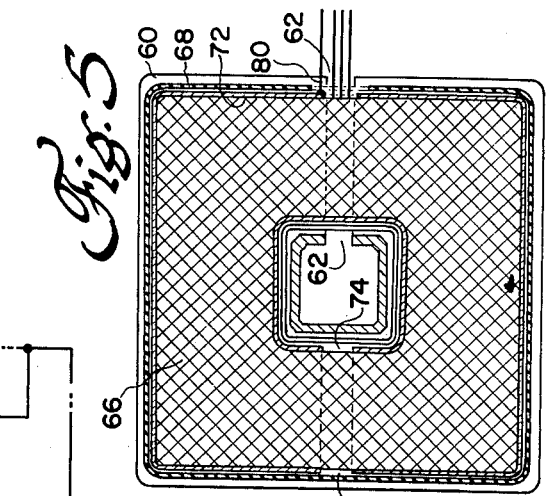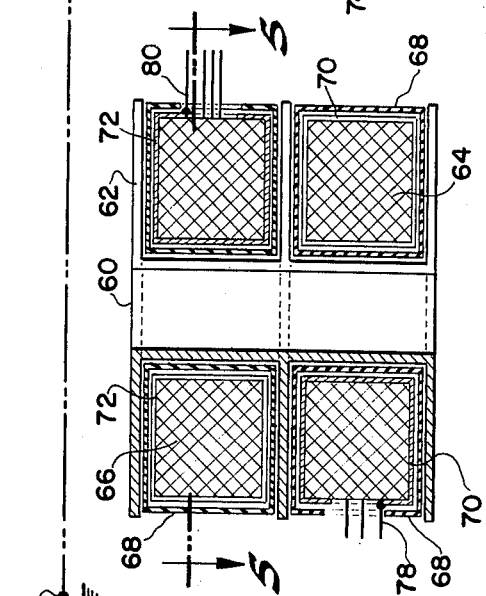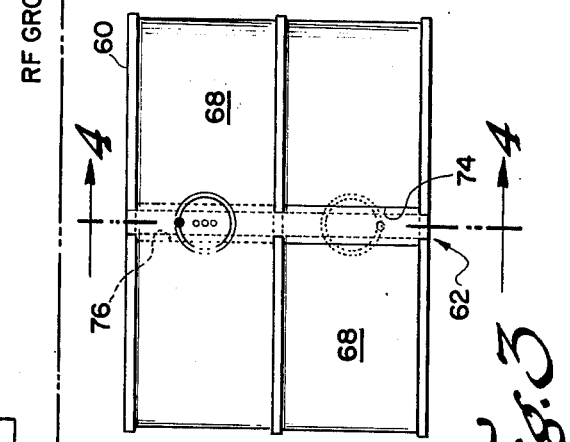

ELECTROMAGNETICALLY SHIELDED ELECTRICAL CONVERTER AND AN IMPROVED ELECTROMAGNETIC SHIELD THEREFOR

This is a continuation of application Ser. No. 555,425, filed Mar. 5, 1975, and now abandoned.

This invention relates generally to an improved electromagnetically shielded electrical converter and to a special type of electromagnetic shield which has been found to be especially useful in such a converter.

This application is related to a copending commonly owned application Ser. No. 555,424 of Mr. John P. Walden and myself filed concurrently herewith and describing an improvement over the invention described herein below. In addition, this application is somewhat related to earlier filed copending commonly owned applications relating to line cord power supply units and various features thereof since the present invention is especially intended for use in such line cord supply units although those in the art will recognize that this invention has other more general application as well. Some of such earlier copending commonly owned applications are Ser. No. 406,162 filed Oct. 15, 1973 now abandoned; Ser. No. 416,115 filed Nov. 15, 1973; Ser. No. 434,580 filed Jan. 18, 1974, now U.S. Pat. No. 3,909,700 and Ser. No. 474,669 filed May 30, 1974, now U.S. Pat. No. 3,880,491.

The exemplary embodiment of this invention includes some features of an electrical converter or power supply unit utilizing a relatively high speed inverter circuit and transformer windings, etc. to isolate input and output voltages and to produce desired output electrical power from available input electrical power. To facilitate the exemplary explanation of this invention, its application to this type of electrical converter circuit will be described, although, as noted above, those in the art will recognize other applications for this invention.

In a typical line cord supply unit, for instance, normal household alternating current at 115 volts is converted to a lower d.c. output voltage. In order to decrease the size of the unit, increase its efficiency, etc., such power supply units usually rectify the available a.c. supply voltage to provide a d.c. supply which, is, in turn, used to drive an inverter circuit. Such inverter circuits typically utilize low loss fast switching solid state devices for alternately switching the polarity of the d.c. supply voltage to the primary winding of a transformer. To reduce the size of the magnetic circuit in the transformer among other reasons, this inverter normally operates at a fairly high frequency such as, for instance, 18kHz. The transformer of such a unit also includes a secondary winding which is magnetically coupled to the primary winding. This arrangement, of course, results in induced alternating voltages in the secondary of the transformer at the same high frequency at which the inverter circuit operates. These high frequency secondary induced voltages are then rectified in an output rectifier to produce the desired low voltage d.c. output.

As will be recognized by those in the art, the rectifying, inverting and transforming circuitry inherently involved in such a converter can produce considerably electromagnetic interference (EMI) especially since the inverter is operating at a fairly high repetition rate and since the inverter normally produces substantially square wave shaped alternating voltages which are rich in high frequency harmonics.

Unless suitably suppressed, these undesirably EMI signals will emanate from the power supply unit and are of sufficient magnitude to cause interference with nearby susceptible electronic circuits such as radio frequency receivers. Such EMI may leave its source within the power supply unit by various means. It may be conducted on the connecting wires to the input and output terminals and it may emanate from the power supply in the form of radiated electromagnetic fields.

Of course, the general problem of suppressing unwanted EMI has been encountered before in the art. However, normal engineering design solutions to these EMI problems are not practical for use in a line cord power supply, for instance, which has severe constraints related to the limited size of the unit and to the necessity of electrically isolating the input and output terminals of the unit due to safety reasons since such a unit will be utilized by the general public.

A straightforward application of the usual EMI suppression techniques would involve enclosing the converter circuitry within a metallic shielding and with electrical filtering circuits connected to the shielding and to the converter circuitry at both the input and output terminals. However, such conventional filtering circuit may well involve more discrete components than are possible within a given size constraint. Furthermore, and perhaps even more importantly, such conventional techniques do not provide the necessary electrical isolation between the input and output terminals required for safety reasons. In addition, the conventional techniques suppose access to an electrical ground potential having substantially the same electrical potential as the earth. However, in applications such as the line cord power supply unit, such ideal circumstances cannot always be anticipated since many existing housewiring systems do not include earth ground connections. Thus, the line cord power supply unit, for instance, must be capable of properly performing using only the typical two-wire connection where one never knows for sure which side of the conventional 115V 60 Hz circuit may be connected to a given input terminal of the unit. Furthermore, neither of the conventional two-wire connections is actually an earth ground reference in a radio frequency sense.

It is now been discovered that substantial reduction in unwanted EMI can be obtained without relying on an actual earth reference potential and while maintaining the necessary isolation between input and output terminals.

In the basic power supply circuitry, it is a transformer which provides the primary electrical isolation between input and output terminals. This invention maintains that necessary isolation by, in effect, separately shielding the various elements related to the input or primary winding side of the transformer and the remaining components related to the output or secondary winding side of the transformer. Furthermore, these two separate systems of EMI shields are separately connected to independent and separate electrical reference pointes which are electrically associated only with the input and output electrical circuits respectively.

Others have attempted to electrically separate the shielding of transformer primary and secondary circuits, for instance, as shown in U.S. Pat. No. 2,896,096, to Schwarzer. However, Schwarzer, for example, relies upon the availability of at least one true earth reference potential and, furthermore, is not actually directed to the suppression of radio frequency EMI but, rather, to the suppression of alternating current hum and power line voltage fluctuations. p Besides electrically referencing the various EMI shields to separate circuit portions in the converter circuitry, this invention provides for connections to at least some of those shields at special null or "center tap" points on the shield surfaces. A given EMI shield comprises an electrically conductive surface defining the boundary of a substantially enclosed volume for containing an EMI source therewithin. According to this invention, this conductive surface is connected to a predetermined electrical reference point via a center tap connection which comprises a predetermined location or null point on the conductive surface where the voltages induced in the surface by the EMI signals therewithin are substantially balanced out such that unwanted injection of EMI voltages to the electrical reference point are substantially reduced. Of course, the importance and value of such center tap connections are especially noticeable where the electrical reference point itself is not absolutely tied to an RF electrical ground or earth potential. Thus, especially in a line cord power supply unit where no such earth reference potential is necessarily available, such a center tap connection to the EMI shield is especially valuable. Without it, significant EMI signals would actually be injected at the selected electrical reference point which is itself, of course, not absolutely fixed with respect to a RF reference potential in the exemplary embodiment.

In the exemplary embodiment to be described in detail below, such center tapped EMI shields are separately provided for the primary and secondary of the transformer. Furthermore, according to one feature of the exemplary embodiment, the secondary of the transformer is actually provided with a second enveloping center tapped EMI shield. In addition, the exemplary embodiment provides an outer guard shield which envelopes the secondary winding shield and is electrically connected to one of the input leads. Conventional loss pass filtering is also used at the input and output leads of the exemplary embodiment to control direct conduction of unwanted EMI.

A more detailed and complete understanding of this invention will be had by reading the following detailed description taken in conjunction with the accompanying drawings, of which:

FIG. 1 is a schematic block diagram of a prior art EMI shielding technique for an electrical power supply unit;

FIGS. 3, 4 and 5 are sectional views of a typical transformer with electromagnetic interference shields according to this invention.

Figure 2:
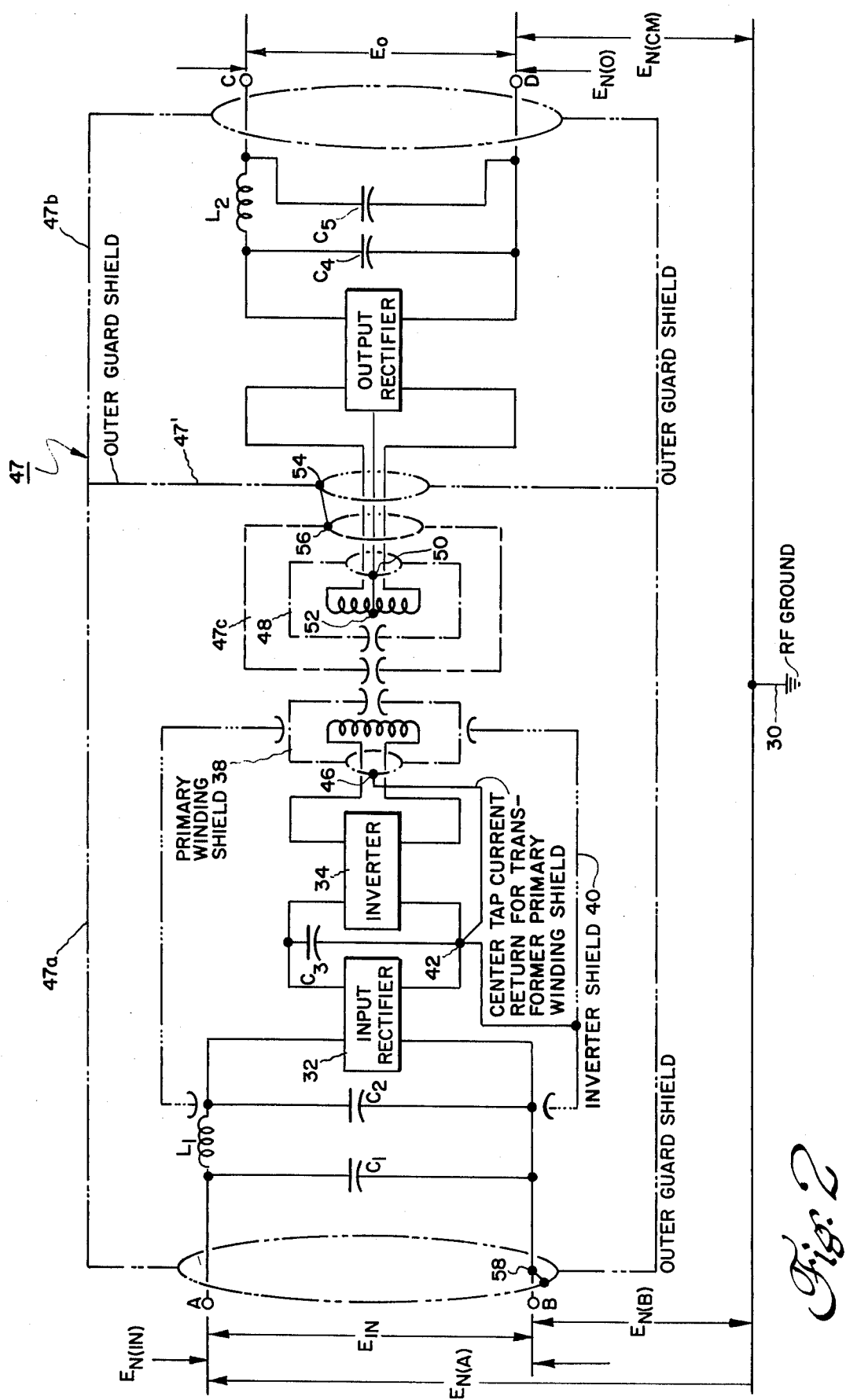
FIG. 2 is a schematic block diagram of an electomagnetically shielded electrical converter according to this invention and also depicting electromagnetic interference shields per se, that are especially useful in such a converter.

A typical approach to prior art EMI shielding techniques of circuits such as inverter powered power supplies is shown in FIG. 1. The power supply circuitry itself comprises an input rectifier 10 which takes an alternating input voltage $E_{in}$ and produces a d.c. supply voltage at 12 for driving an inverter 14. Typically, the inverter will operate at a fairly high frequency compared to the normal line frequency of 60 Hz. For instance, the inverter 14 may operate at 18kHz or at even higher frequencies. In this manner, the d.c. supply voltage at 12 is converted into an approximately square wave shaped alternating high frequency voltage and current at 16 which is then passed through the primary winding of a transformer 18. The primary winding of the transformer is magnetically coupled to a conventional secondary winding which then produces approximately square wave shaped alternating voltage at the inverter frequency but at a voltage determined by the transformer turns ratio at secondary output terminals 20. Since, in the exemplary embodiment, the desired output voltage $E_o$ is a low d.c. voltage, the a.c. voltage at 20 is rectified in an output rectifier 22 which produces the desired d.c. output voltage $E_o$ therefrom. The rectifier, inverter and transformer components may be conventional components that should be well-known to those in the art. Alternatively, special exemplary embodiments for the details of newer types of such components are shown, for instance, in the above cited copending commonly owned related applications.

According to conventional EMI suppression techniques, the circuitry just described in FIG. 1 might typically be enclosed in metallic shielding 24 with lumped parameter low pass filters comprising inductance and capacitance units being associated with both the input and output leads and the metallic shield 24 itself as shown, for instance, in FIG. 1. Additional EMI suppression may be achieved using a typical prior art installation which would provide for an RF ground connection 26 as also shown in FIG. 1. As should now be appreciated, the isolation between input and output terminals has been considerably reduced by such prior art techniques. Furthermore, in applications such as the line cord power supply unit, there will be no available RF ground reference connection. Furthermore, the number of discrete components involved presents a problem when severe size restraints are imposed as in a line cord power supply unit application.

An inverter powered a.c./d.c. power supply unit constructed in accordance with this invention is shown in an exemplary embodiment at FIG. 2. Although an RF ground reference potential such as 30 shown in FIG. 2 is not normally available within a line cord power supply unit per se, such a reference potential has been shown in FIG. 2 so as to more clearly illustrate the various EMI noise voltages that exist at the input and output terminals of such a unit. There is the usual a.c. input voltage $E_{in}$ and the d.c. outout voltage $E_o$. Superimposed across the input terminals A and B is a noise or EMI voltage component $E_{N(in)}$. In addition, there is a similar EMI noise voltage across the output terminals C and D labeled $E_{N(o)}$ in FIG. 2. In addition, at the input terminals A and B, there are potentially separate and independent EMI signals with respect to an RF ground potential labeled $E_{N(a)}$. At the output terminals, the common mode EMI noise component for output terminals C and D is shown as $E_{N(cm)}$.

The EMI components directly between terminals A and B and terminals C and D are controlled by normal line filtering with lumped parameter low pass filters comprising the pi filter networks using the lumped parameter inductances and capacitances shown in FIG. 2. Furthermore, such control of the EMI between input terminals A and B also constitutes substantial control of the EMI voltages between these terminals and an RF earth ground since there is a fairly low finite RF impedance from either side of the usual 115V 60 Hz supply to RF each ground.

However, since there is no natural low RF impedance path from the output terminals C and D to an RF earth ground potential, the common mode output EMI voltage must be attenuated to acceptable levels by other techniques. As shown in FIG. 2, these other techniques according to this invention involve several special features which will now be described in detail.

First of all, there is electrostatic shielding provided for the input rectifier 32, the inverter circuitry 34 and the transformer primary winding 36. As shown in FIG. 2, such shielding includes a primary winding shield 38 and an inverter shield 40, both of which are electrically connected to the common or return voltage connection 42 of the d.c. supply voltage provided by the input rectifier 32.

In a typical power supply circuit, the voltage differential between the primary winding 36 and the primary winding shield 38 is relatively high compared to the electrical impedance therebetween, i.e., because of the capacitive coupling therebetween. To minimize the impedance between the shield 38 and the common connection 42, a current return lead 44 is separately provided for the primary winding shield 38. Furthermore, the connection of the current return lead 44 to the primary winding shield is especially selected at 46 to be at the point where the primary winding leads enter the primary winding shield 38 at substantially half of the circumference of the coil from the primary winding shield gap (a gap in the electrical conductivity to prevent the winding shield from acting as a shorted electrical circuit with respect to voltages induced therein by the normally desired magnetic transformer flux). Another way of stating it is to say that the current return lead 44 is connected approximately one-half way around the coil circumference substantially opposite the normal gap in electrical conductivity. This special "center tap" connection point on the primary winding shield 38 is especially selected for balance purposes. The induced EMI voltages in the shield 38 are of such magnitudes that an arbitrary connection of the current return lead 44 thereto might well inject an EMI signal level to the common return node 42 which would, in due course, produce an $E_{N(o)}$ signal exceeding permissible levels. In the preferred embodiment, the center tap connection to the shield is maintained approximately within ± 1% dimensional precision of the desired point exactly one-half way around the coil or, in other words, opposite from the gap in electrical conductivity of the shield.

As will be described more fully below with respect to the description of FIGS. 3, 4 and 5, the electromagnetic shield 38 includes a gap in electrical conductivity along at least part of the electrically conductive surface boundary where such a gap is normally provided to prevent the shield itself from becoming a shorted electrical circuit (i.e., a one-turn transformer winding) with respect to voltages induced therein by desired magnetic flux fields and the electrical center tap connection is located substantially equidistant over the conductive surface along at least two opposed directions from the gap. An illustration of such a center tap connection is shown, for example, in the cross-section in FIG. 4.

The exemplary embodiment shown in FIG. 2 also includes an outer guard shield 47 comprising guard shield portions 47a, 47b and 47c with electrically conductive surfaces. Shield portions 47a and 47b substantially enclose the input and output circuitry, respectively, in separate conductively enclosed volumes.

Outer guard shield portion 47c in one exemplary embodiment containing outer guard shield surface 47' shields the primary transformer winding 36 and shield 38 which are part of the input circuit from the secondary transformer winding and shield 48 which are part of the output circuit. As may be seen in FIG. 2, outer guard shield portion 47a has surfaces including 47' and 47c which completely enclose the input rectifier and inverter and primary windings of the transformer as well as the input line filtering components. The outer guard shield portion 47b has surfaces also including 47' and 47c which completely enclose the output circuit including the secondary of the transformer, the output rectifiers and the output line filtering components. The guard shield portion 47c, enclosed within the guard shield portions 47a and 47b, actually separates the primary and secondary windings of the transformer. As illustrated in FIG. 2, outer guard shield 47 is referenced to one of the two input leads A and B at 58 on lead B. It should be noted that there is no such connection to the output leads C and D.

Selection of the center tap connection guard shield portion 47c to shield section 47', common to both shield portions 47a and 47b, is at points 54 and 56. Point 56 on the guard shield portion 47c is selected for balance purposes in the same manner as that described above for primary winding shield 38 and its center tap connection point 46. The selection of the connection point 54 on shield section 47' is a matter of design choice that varies with the specific leakage flux parameters of the transformer and capacitive elements in the input circuitry. In general, the connection point 54 is selected to provide a minimum voltage difference between point 54 and the common point 58 on lead B.

Enclosed within the shield portion 47c is a secondary winding shield 48 which has a center tapped shield connection 50, which in the exemplary embodiment, is electrically referenced to the center tap 52 of the balanced center tapped secondary transformer winding. As with the center tapped shield connections 54, shield connection point 50 is selected in the same manner as that described for the primary winding shield 38 and tap 46.

FIG. 3, a plan view of a typical transformer useful in the practice of the present invention, illustrates a metallic bobbin 60 havig a gap 62 therein, which gap completely separates one leg of the bobbin. The bobbin 60, illustrated more clearly in the sectional view of FIG. 4, has a primary winding 64 and a secondary winding 66. Each winding is wound on a portion of the bobbin 60 but insulated therefrom by an insulator 68. The primary and secondary windings are shielded from each other by shields 70 and 72, respectively, which completely surround each winding, but for gaps 74 and 76 which prevent the shields from electrically short-circuiting the primary and secondary windings 64 and 66.

FIG. 4 also illustrates connections 78 and 80 to the primary and secondary winding shields, which connections are especially selected at the point on the shields approximately one-half way around the coil circumference substantially opposite the normal gap in electrical conductivity. More specifically, connections 78 and 80 are selected in the same manner outlined above with respect to the selection of connection 46 to primary winding 36 of FIG. 2.

FIG. 5, a view taken along lines 5—5 of FIG. 4, illustrates the gap 62 and connection 80 to the secondary winding 66 on the bobbin 60.

As should be noted, there is thus provided a system of EMI shields for the various components of the power supply unit wherein at least a portion of the input components are shielded and referenced to a first reference point and wherein at least a part of the output components are shielded and referenced to a separate electrically isolated reference point, namely, the center tap connection of the secondary output winding from the transformer. Furthermore, the EMI shields that are actually referenced to circuit connection points within the power supply circuitry itself that are not necessarily RF ground potentials are referenced thereto via center tap shield connections which comprise null points on the conductive surfaces of the EMI shields whereat voltages induced by EMI sources contained therewithin are substantially balanced out such that injection of unwanted induced EMI voltages to such floating reference points are substantially reduced.

Although one exemplary embodiment of this invention has been described in detail, those skilled in the art will recognize that there are many possible modifications and variants of the exemplary embodiments which will include the improved and novel features described above. Accordingly, all such modifications and variations are intended to be included within the scope of this invention as defined in the appended claims.

WHAT IS CLAIMED IS

1. An electromagnetic interference shield for electrically enclosing a source of electromagnetic interference signals and thus substantially reducing the emanation of such signals beyond the enclosure boundary, said electromagnetic interference shield comprising:
   an electrically conductive surface defining the boundary of a substantially enclosed volume for containing said source therewithin; and
   an electrical center tap connection electrically connected to a first predetermined electrical reference point,
   said electrical center tap connection being located at a predetermined null point on said surface where voltages induced in said surface by said electromagnetic interference signals are substantially balanced out whereby injection of such induced interference voltages to said first reference point are substantially reduced.

2. An electromagnetic interference shield as in claim 1 wherein:
   said electrically conductive surface includes a gap in electrical conductivity along at least part of said boundary to prevent the surface from effectively becoming a shorted electrical circuit with respect to voltages induced therein by desired magnetic flux fields that may also be associated with said source, and
   said electrical center tap connection is located substantially equidistant over said surface along at least two opposed directions from said gap.

3. An electromagnetic interference shield as in claim 2 further comprising a transformer winding contained therewithin as said source.

4. As electromagnetic interference shield as in claim 3 wherein said transformer winding is a center tapped winding having a center tap lead comprising said first predetermined reference point.

5. An electromagnetic interference shield as in claim 3 further comprising:
   a second electrically conductive surface defining the boundary of a substantially enclosed volume containing both said transformer winding and said first-mentioned surface, and
   a second electrical center tap connection for electrically connecting said second surface to a second predetermined electrical reference point,
   said second electrical center tap connection being located at a predetermined null point on said second surface where voltages induced in said second surface by said electromagnetic interference signals are substantially balanced out whereby injection of such induced interference voltages to said second reference point are substantially reduced.

6. An electromagnetic interference shield as in claim 5 wherein said first and second reference points are different.

7. An electromagnetic interference shield as in claim 5 wherein said transformer winding is a center tapped winding having a center tap lead comprising said first predetermined reference point.

8. An electromagnetically shielded electrical converter having an electrically isolated input and output for converting input electrical energy to output electrical energy having desired voltage and current characteristics, said converter comprising:
   inverter circuit means having an input connected for converting said input electrical energy to a predetermined form of alternating electrical energy;
   transformer means;
   said transformer means comprising a primary winding electrically connected to receive said predetermined form of alternating electrical energy and to produce a corresponding magnetic flux;
   said transformer means further comprising a secondary winding magnetically coupled to said primary winding for responding to said magnetic flux and for producing induced electrical energy in said secondary winding having predetermined electrical voltage and current characteristics;
   a first electrical reference point electrically associated with only said input electrical energy;
   a primary winding shield means substantially enclosing said primary winding and being electrically connected to said first electrical reference point,
   a second electrical reference point electrically associated with only said output electrical energy,
   said first and second electrical reference points being electrically isolated with respect to each other, and
   a secondary winding shield means substantially enclosing said secondary winding and bearing electrically connected to said second electrical reference point whereby the converter input and output are maintained in safe electrical isolation while yet providing substantial electromagnetic shielding for both the primary and secondary winding.

9. An electromagnetically shielded electrical converter as in claim 8 wherein said primary winding shield means comprises:
   a first electrically conductive surface defining the boundary of a substantially enclosed volume containing said primary winding, and
   a first electrical center tap connection to said first reference point, said first center tap being located at a predetermined null point on said first surface where voltages induced by electromagnetic interference signals are substantially balanced out whereby injection of such induced interference voltages to said first reference point are substantially reduced.

10. An electromagnetically shielded electrical converter as in claim 8 wherein said primary winding shield means comprises:
   a first electrically conductive surface defining the boundary of a substantially enclosed volume containing said primary winding and including a gap in electrical conductivity along at least part of said boundary to prevent the first surface from effectively becoming a shorted electrical circuit with respect to voltages induced therein by said magnetic flux, and
   a first electrical center tap connection to said first reference point, said first center tap being located substantially equidistant over said first surface along at least two opposed directions from said gap whereby injection of induced interference voltages to said first reference point are substantially reduced.

11. An electromagnetically shielded electrical converter as in claim 10 wherein said inverter circuit means comprises a common return electrical connection for a d.c. supply voltage which common return constitutes said first electrical reference point.

12. An electromagnetically shielded electrical converter as in claim 8 further comprising:
   an inverter shield means substantially enclosing said inverter circuit means and being electrically connected to said first electrical reference point.

13. An electromagnetically shielded electrical converter as in claim 12 wherein said inverter circuit means comprises a rectifier means for converting said input electrical energy into d.c. supply voltage for powering said inverter circuit means.

14. An electromagnetically shielded electrical converter as in claim 9 further comprising:
   an inverter shield means substantially enclosing said inverter circuit means and being electrically connected to said first electrical reference point.

15. An electromagnetically shielded electrical converter as in claim 14 wherein said inverter circuit means comprises a rectifier means for converting said input electrical energy into d.c. supply voltage for powering said inverter circuit means.

16. an electromagnetically shielded electrical converter as in claim 10 further comprising:
   an inverter shield means substantially enclosing said inverter circuit means and being electrically connected to said first electrical reference point.

17. An electromagnetically shielded electrical converter as in claim 16 wherein said inverter circuit means comprises a rectifier means for converting said input electrical energy into d.c. supply voltage for powering said inverter circuit means.

18. An electromagnetically shielded electrical converter as in claim 8 wherein secondary winding shield means comprises:
   a second electrically conductive surface defining the boundary of a substantially enclosed volume containing said secondary winding, and
   a second electrical center tap connection to said second reference point, said second center tap being located at a predetermined null point on said first surface where voltages induced by electromagnetic interference signals are substantially balanced out whereby injection of such induced interference voltages to said second reference point are substantially reduced.

19. An electromagnetically shielded electrical converter as in claim 18 wherein said secondary winding is center tapped and wherein the center tap of the secondary winding constitutes the second electrical reference point.

20. An electromagnetically shielded electrical converter as in claim 18 wherein said primary winding shield means comprises:
   a first electrically conductive surface defining the boundary of a substantially enclosed volume containing said primary winding, and
   a first electrical center tap connection to said first reference point, said first center tap being located at a predetermined null point on said first surface where voltages induced by electromagnetic interference signals are substantially balanced out whereby injection of such induced interference voltages to said first reference point are substantially reduced.

21. An electromagnetically shielded electrical converter as in claim 20 wherein said secondary winding is center tapped and wherein the center tap of the secondary winding constitutes the second electrical reference point.

22. An electromagnetically shielded electrical converter as in claim 20 further comprising:
   an inverter shield means substantially enclosing said inverter circuit means and being electrically connected to said first electrical reference point.

23. An electromagnetically shielded electrical converter as in claim 22 wherein said secondary winding is center tapped wherein the center tap of the secondary winding constitutes the second electrical reference point.

24. An electromagnetically shielded electrical converter as in claim 22 wherein said inverter circuit means comprises a rectifier means for converting said input electrical energy into d.c. supply voltage for powering said inverter circuit means.

25. An electromagnetically shielded electrical converter as in claim 18 wherein said primary winding shield means comprises:
   a first electrically conductive surface defining the boundary of a substantially enclosed volume containing said primary winding and including a gap in electrical conductivity along at least part of said boundary to prevent the first surface from effectively becoming a shorted electrical circuit with respect to voltages induced therein by said magnetic flux, and
   a first electrical center tap connection to said first reference point, said first center tap being located substantially equidistant over said first surface along at least two opposed directions from said gap whereby injection of induced interference voltages to said first reference point are substantially reduced.

26. An electromagnetically shielded electrical converter as in claim 25 wherein said inverter circuit means comprises a common return electrical connection for a d.c. supply voltage which common return constitutes said first electrical reference point.

27. An electromagnetically shielded electrical converter as in claim 25 further comprising:
   an inverter shield means substantially enclosing said inverter circuit means and being electrically connected to said first electrical reference point.

28. An electromagnetically shielded electrical converter as in claim 27 wherein said inverter circuit means comprises a rectifier means for converting said input electrical energy into d.c. supply voltage for powering said inverter circuit means.

29. An electromagnetically shielded electrical converter as in claim 18 wherein said secondary winding shield means further comprises:
a third electrically conductive surface defining the boundary of a substantially enclosed volume containing said second surface and said secondary winding, and
a third electrical center tap connection being located at a predetermined null point on said third surface where voltages induced by electromagnetic interference signals are substantially balanced out.

30. An electromagnetically shielded electrical converter as in claim 29 further comprising:
an outer guard shield means including a fourth electrically conductive surface which substantially encloses said primary winding and inverter circuit means and which separately also substantially encloses said secondary winding and which passes between said secondary and primary windings,
said third electrical center tap being electrically connected to said outer guard shield means.

31. An electromagnetically shielded electrical power supply for converting an a.c. input voltage into a d.c. output voltage, said power supply comprising:
input means having input leads connected for reserving said a.c. input voltage;
input rectifier means connected to receive said a.c. input voltage and to produce a d.c. voltage therefrom at an output which includes a common return connection for such d.c. supply voltage;
inverter means connected to the output of said input rectifier means for producing a substantially square shaped alternating voltage output of predetermined electrical characteristics;
primary winding means connected to said alternating voltage output for producing a corresponding alternating magnetic flux;
secondary winding means magnetically coupled to said primary winding means for producing another alternating voltage output corresponding to said alternating magnetic flux;
output rectifier means connected to said secondary winding means for producing said d.c. output voltage at output leads from said another alternating voltage output;
a primary winding shield means comprising a first electrically conductive surface defining the boundary of a substantially enclosed volume containing said primary winding means therewithin; and
a first electrial center tap connection electrically connecting said common return to a predetermined null point on said first surface where voltages induced by electromagnetic interference emanating from therewithin are substantially balanced out whereby injection of such induced interference voltages to said common return are substantially reduced.

32. An electromagnetically shielded electrical power supply as in claim 31 wherein said primary winding shield means further comprises:
an inverter shield means comprising an electrically conductive surface defining the boundary of a substantially enclosed volume containing said input rectifier means and said inverter means and also electrically connected to said common return.

33. An electromagnetically shielded electrical converter as in claim 31 further comprising:
an outer guard shield means comprising an electrically conductive surface defining the boundary of two substantially enclosed volumes with one such volume containing said input means, said input rectifier means, said inverter means and said primary winding means and with the other such volume containing said secondary winding means and said output rectifier means, and wherein
said outer guard shield means is electrically connected to only one of said input leads.

34. An electromagnetically shielded electrical converter as in claim 32 and further comprising:
an outer guard shield means comprising an electrically conductive surface defining the boundary of two substantially enclosed volumes with one such volume containing said input means, said input rectifier means, said inverter means and said primary winding means an with the other volume such volume containing said secondary winding means and said output rectifier means, and wherein
said outer guard shield means is electrically connected to only one of said input leads.

35. An electromagnetically shielded electrical converter as in claim 31 further comprising:
an output electrical reference point electrically isolated from said common return;
a secondary winding shield means including a second electrically conductive surface defining the boundary of a substantially enclosed volume containing said secondary winding means therewithin, and
a second electrical center tap connection electrically connecting said output reference point to a predetermined null point on said second surface where voltages induced by electromagnetic interference emanating from therewithin are substantially balanced out whereby injection of such induced interference voltages to said output reference point are substantially reduced.

36. An electromagnetically shielded electrical converter as in claim 35 wherein said secondary winding means comprises a center tapped winding and where the center tap of the winding is the output electrical reference point.

37. An electromagnetically shielded electrical converter as in claim 32 and further comprising:
an output electrical reference point electrically isolated from said common return;
a secondary winding shield means including a second electrically conductive surface defining the boundary of a substantially enclosed volume containing said secondary winding means therewithin, and
a second electrical center tap connection electrically connecting said output reference point to a predetermined null point on said second surface where voltages induced by electromagnetic interference emanating from therewithin are substantially balanced out whereby injection of such induced interference voltages to said output reference point are substantially reduced.

38. An electromagnetically shielded electrical converter as in claim 37 wherein said secondary winding means comprises a center tapped winding and where the center tap of the winding is the output electrical reference point.

39. An electromagnetically shielded electrical converter as in claim 33 further comprising:
an output electrical reference point electrically isolated from said common return;
a secondary winding shield means including a second electrically conductive surface defining the boundary of a substantially enclosed volume containing said secondary winding means therewithin, and
a second electrical center tap connection electrically connecting said output reference point to a predetermined null point on said second surface where voltages induced by electromagnetic interference emanating from therewithin are substantially balanced out whereby injection of such induced interference voltages to said output reference point are substantially reduced.

40. An electromagnetically shielded electrical converter as in claim 39 wherein said secondary winding means comprises a center tapped winding and where the center tap of the winding is the output electrical reference point.

41. An electromagnetically shielded electrical converter as in claim 40 wherein said secondary winding shield means further includes:
a third electrially conductive surface defining the boundary of a substantially enclosed volume containing said second and said secondary winding means therewithin; and
a third electrical center tap connection electrically connecting said outer guard shield means to a predetermined null point on said third surface where voltages induced by electromagnetic interference emanating from therewithin are substantially balanced out whereby rejection of such induced interference voltages to said outer guard shield means are substantially reduced.

42. An electromagnetically shielded electrical converter as in claim 41 wherein said input means and said output rectifier means include low-pass filter means for reducing the conductive coupling of electromagnetic interference along said input and output leads respectively.

43. An improved electromagnetically shielded electrical converter having at least one electrical reference point, and inverter and transformer windings therewithin constituting at least one source of electromagnetic interference signals, said improvement comprising:
an electrically conductive surface defining the boundary of a substantially enclosed volume for containing said source therewithin; and
an electrical center tap connection for electrically connecting said surface to a first predetermined electrical reference point,
said electrical center tap connection being located at a predetermined null point on said surface where voltages induced in said surface by said electromagnetic interference signals are substantially balanced out whereby injection of such induced interference voltages to said first reference point are substantially reduced.

44. An improved electromagnetically shielded electrical converter as in claim 43 wherein:
said electrically conductive surface includes a gap in electrical conductivity along at least part of said boundary to prevent the surface from effectively becoming a shorted electrical circuit with respect to voltages induced therein by desired magnetic flux fields that may also be associated with said source, and
said electrical center tap connection is located substantially equidistant over said surface along at least two opposed directions from said gap.

45. An improved electromagnetically shielded electrical converter as in claim 44 further comprising a transformer winding contained within said volume.

46. An improved electromagnetically shielded electrical converter as in claim 45 wherein said transformer winding is a center tapped winding having a center tap lead comprising said first predetermined reference point.

47. An improved electromagnetically shielded electrical converter as in claim 45 further comprising:
a second electrically conductive surface defining the boundary of a substantially enclosed volume containing both said transformer winding and said first-mentioned surface, and
a second electrical center tap connection for electrically connecting said second surface to a second predetermined electrical reference point,
said second electrical center tap connection being located at a predetermined null point on said second surface where voltages induced in said second by said electromagnetic interference signals are substantially balanced out whereby injection of such induced interference voltages to said second reference point are substantially reduced.

48. An improved electromagnetically shielded electrical converter as in claim 45 wherein said first and second reference points are different.

49. An improved electromagnetically shielded electrical converter as in claim 45 wherein said transformer winding is a center tapped winding having a center tap lead comprising said first predetermined reference point.

* * * * *